"""
3,224,973
DIALKYL HYDROXYBENZYL PHOSPHONATES
AS ANTIOXIDANTS
Gordon G. Knapp, Royal Oak, Mich., assignor to Ethyl Corporation, New York, N.Y., a corporation of Virginia
No Drawing. Original application Sept. 1, 1960, Ser. No. 53,354, now Patent No. 3,155,704, dated Nov. 3, 1964. Divided and this application July 23, 1962, Ser. No. 211,891
15 Claims. (Cl. 252—49.8)

This application is a division of application Serial No. 53,354, filed September 1, 1960, now U.S. Patent No. 3,155,704.

This invention deals with a novel class of compounds, their preparation and their use as antioxidants. More particularly, it relates to the preparation of a novel and unusual class of substituted phenolic phosphonate compounds and the embodiment of these compounds as stabilizers and antioxidants for organic material.

It is the object of this invention to provide a novel class of chemical compounds. A further object of this invention is to provide a method preparing these novel compounds. Another object of this invention is to provide novel compositions of matter comprising organic material stabilized against oxidative deterioration. A specific object of this invention is to provide lubricating oil stabilized against oxidative deterioration. Another specific object of this invention is to provide petroleum wax stabilized against oxidative deterioration. Other objects will become apparent from the following description of the invention.

The above and other objects are accomplished by provision of a compound having the formula:

(I)
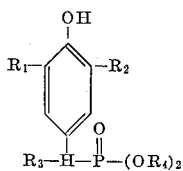

wherein $R_1$ is an alkyl radical having from 1 to 12 carbon atoms, $R_2$ is an alkyl radical having from 3 to 12 carbon atoms, $R_3$ is selected from the group consisting of hydrogen, alkyl radicals having from 1 to 12 carbon atoms and mononuclear aryl radicals having from 6 to 12 carbon atoms and $R_4$ is an alkyl radical having from 1 to 12 carbon atoms. Examples of the compounds of this invention include:

di-n-amyl(α-methyl-3-ethyl-5-isopropyl-4-hydroxybenzyl) phosphonate;
di-n-decyl(α-amyl-3-n-octyl-5-n-dodecyl-4-hydroxybenzyl) phosphonate;
di-n-heptyl[α-ethyl-3-amyl-5-(2'-heptyl)-4-hydroxybenzyl] phosphonate;
di-3'-dodecyl[α-(4''-undecyl)-3-n-propyl-5-tert-butyl-4-hydroxybenzyl] phosphonate;
di-2'-octyl(α-n-propyl-3-n-nonyl-4-hydroxybenzyl) phosphonate;
di-n-undecyl[α-(3'-heptyl)-3-n-hexyl-5-n-butyl-4-hydroxybenzyl]phosphonate;
di-methyl(3,5-di-tert-butyl-4-hydroxybenzyl) phosphonate;
diethyl(3,5-di-tert-butyl-4-hydroxybenzyl) phosphonate;
diisopropyl(3,5-di-tert-butyl-4-hydroxybenzyl)phosphonate;
di-sec-butyl(3,5-di-tert-butyl-4-hydroxybenzyl) phosphonate;
di-n-hexyl(3,5-di-tert-butyl-4-hydroxybenzyl) phosphonate;
di-n-butyl(α-p-hexylphenyl-3,5-diisopropyl-4-hydroxybenzyl)phosphonate;
di-n-nonyl(α-phenyl-3-n-undecyl-5-n-decyl-4-hydroxybenzyl)phosphonate.

The compounds of this invention are water insoluble, white to yellow, crystalline solids or, in the higher members, viscous liquids. They are substantially non-corrosive and non-volatile, facilitating their incorporation into a wide range of organic material.

Although the compounds of this invention, described in the above formula, are those in which $R_4$ is an alkyl radical having from 1 to 12 carbon atoms, haloalkyl radicals having from 1 to 12 carbon atoms are also useful.

A preferred embodiment of this invention consists of compounds of the above formula wherein $R_3$ is hydrogen. These compounds are preferred because of their ease of preparation from readily available starting materials and their excellent stability. Among the compounds represented by this preferred embodiment are:

di-3'-chloro-n-heptyl(3-n-dodecyl-5-methyl-4-hydroxybenzyl) phosphonate;
diisopropyl(3,5-di-tert-butyl-4-hydroxybenzyl) phosphonate;
di-4'-dodecyl(3-n-propyl-5-n-octyl-4-hydroxybenzyl) phosphonate;
dimethyl(3,5-di-tert butyl-4-hydroxybenzyl)phosphonate;
diethyl(3-methyl-5-amyl-4-hydroxybenzyl)phosphonate;
di-2'-bromo-butyl(3-methyl-5-tert-butyl-4-hydroxybenzyl)phosphonate;
diethyl(3,5-di-tert-butyl-4-hydroxybenzyl) phosphonate.

Another preferred embodiment of this invention consists of compounds of the above formula wherein $R_2$ is an alpha-branched alkyl radical having from 1 to 12 carbon atoms with no halogen substitution. These are particularly preferred because of their ease of preparation and their excellent antioxidant properties. Among the compounds represented by this preferred embodiment are:

diisopropyl(3-methyl-5-isopropyl-4-hydroxybenzyl) phosphonate;
di-n-hexyl(3,5-di-tert-butyl-4-hydroxybenzyl) phosphonate;
di-amyl(3-n-butyl-5-tert-butyl-4-hydroxybenzyl) phosphonate;
di-n-heptyl[3-methyl-5-(3'-n-dodecyl)-4-hydroxybenzyl] phosphonate;
di-sec-butyl(3,5-di-tert-butyl-4-hydroxybenzyl) phosphonate;
di-n-dodecyl(3-isopropyl-5-n-dodecyl-4-hydroxybenzyl) phosphonate.

The most particularly preferred compounds of this invention consists of compounds of the above formula wherein $R_3$ is hydrogen, $R_4$ has no halogen substitution and $R_1$ and $R_2$ are both tertiary butyl radicals. Among the compounds represented by this preferred embodiment are:

dimethyl(3,5-di-tert-butyl-4-hydroxybenzyl)phosphonate;
diethyl(3,5-di-tert-butyl-4-hydroxybenzyl)phosphonate;
diisopropyl(3,5-di-tert-butyl-4-hydroxybenzyl) phosphonate;
di-sec-butyl(3,5-di-tert-butyl-4-hydroxybenzyl) phosphonate;
di-n-hexyl(3,5-di-tert-butyl-4-hydroxybenzyl) phosphonate.

These compounds are most superior antioxidants in lubricating oil and other organic media.

The compounds of this invention can be produced by a two-step process which comprises reacting a compound having the formula:

(II)

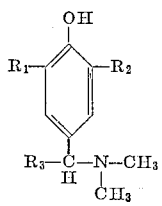

wherein $R_1$, $R_2$ and $R_3$ are as in Formula I, with methyl iodide, and then reacting the methiodide thus produced with a trialkyl phosphite where the alkyl radicals each have from 1 to 12 carbon atoms. The trialkyl phosphite may be prepared by the reaction of a suitable alcohol with phosphorus trichloride in the presence of pyridine. For example, tri-n-dodecyl phosphite may be prepared by the reaction of n-dodecanol with phosphorus trichloride in the presence of pyridine. In a similar manner, isopropyl alcohol can react with phosphorus trichloride in the presence of pyridine to produce triisopropyl phosphite. Also, sec-butyl alcohol can react with phosphorus trichloride, in pyridine, to produce tri-sec-butyl phosphite.

The compounds of Formula II can be prepared by reacting a suitable 2,6-dialkylphenol with an aldehyde having from 1 to 13 carbon atoms and with dimethyl amine.

The solvents used in the practice of this invention may be any one of the unsaturated aromatics having from 6 to 12 carbon atoms such as benzene, toluene, xylene, mesitylene and hexylbenzene; any one of the saturated hydrocarbons and their isomers having from 5 to 19 carbon atoms such as pentane, hexane, isooctane, dodecane, hexadecane and nonadecane; aliphatic alcohols having from 1 to 13 carbon atoms such as methanol, ethanol, octanol, undecanol and stearyl alcohol; ketones having from 3 to about 13 carbon atoms such as acetone, methyl ethyl ketone, methyl-n-propyl-ketone and benzophenone; glycols having up to 6 carbon atoms such as ethylene glycol and hexamethylene glycol; the monoethers of the lower glycols such as ethylene glycol monomethyl ether up to ethylene glycol monoamyl ether; dioxane; or the ethers such as ethyl ether and propyl ether.

The temperatures employed vary from about 20° C. to the reflux temperature of the highest boiling solvent, about 305° C. at reaction times from one-half hour to one week or more to give a good yield of product.

To obtain the elevated temperatures sometimes desired in the reactions, elevated pressure may be resorted to. However, with most of the reactants, atmospheric pressure is sufficient.

The following examples illustrate the compounds of this invention and their preparation according to the method outlined above.

*Example 1*

3,5-di-tert-butyl-4-hydroxybenzyl dimethylamine (24.7 parts) was dissolved in 400 parts of dry benzene and mixed with a solution of 14.68 parts of methyl iodide in 50 parts of benzene in a reaction vessel equipped with a water condenser, stirrer, thermometer and means of heating. The solution was allowed to stand for 20 minutes during which time 3,5-di-tert-butyl-4-hydroxybenzyl dimethylamine methiodide precipitated and turned to a gel. The gel was filtered, air dried by suction and found to have a melting point of 182 to 185° C. This methiodide (3.53 parts) was suspended in 25 parts of dioxane and to this was added 1.19 parts of trimethyl phosphite. The mixture was then refluxed for two and one-half hours with stirring. After cooling and pouring into 250 parts of cooled water, dimethyl(3,5-di-tert-butyl-4-hydroxybenzyl) phosphonate, an orange amorphous material, came out of the solution. This solid was filtered and dried (with suction) to yield 1.67 parts (65 percent) of the product, which after recrystallization from hexane-dioxane was obtained as yellow prisms melting at 151–157° C.

Infrared absorption analysis shows tertiary butyl groups at 7.16 and 7.33 microns, a hydroxyl group at 2.72 microns, a phosphoryl group at 7.96 microns, a phosphorus-oxygen-aliphatic carbon group at 9.65 microns and tetra-substitution at 11.27 microns.

Good results are also obtained when other trialkyl phosphites are reacted with 3,5-di-tert-butyl-4-hydroxybenzyl dimethylamine methiodide in the manner of Example 1. For example, reacting the above stated methiodide with triethyl phosphite produces diethyl-3,5-di-tert-butyl-4-hydroxybenzyl) phosphonate. Also, reacting the methiodide of Example 1 with tri-sec-butyl phosphite produces di-sec-butyl(3,5 - di - tert - butyl-4-hydroxybenzyl) phosphonate. Likewise, the reaction of triisopropyl phosphite with the methiodide of Example 1 gives diisopropyl(3,5-di-tert-butyl-4-hydroxybenzyl)phosphonate. Also, di-n-hexane-(3,5 - di - tert-butyl-4-hydroxybenzyl)phosphonate can be produced by the reaction of the methiodide of Example 1 and tri-n-hexyl phosphite.

*Example 2*

In a reaction vessel equipped with a stirrer, 50 parts of 3 - (2'-dodecyl)-5-(3'-dodecyl)-α-methyl-4-hydroxybenzyl dimethylamine [prepared by the reaction of 2-(2'-dodecyl)-6-(3'-dodecyl)phenol with acetaldehyde and dimethylamine] are reacted with 30.0 parts of methyl iodide in 100 parts of ethylene glycol for one hour at 20° C. The methiodide thus formed is filtered and air dried by suction. Ten parts of this methiodide is then added to 7.0 parts of tri(2-ethyldecyl)phosphite in 50 parts of benzophenone, preheated to 60° C., in a reaction vessel equipped with heating means, water cooled condenser, a thermometer and a stirrer. The reaction mixture is heated to 305° C. and held at that temperature for one-half hour. After cooling to 60° C. and pouring into 300 parts of cooled water, a precipitate is formed which, after recrystallization from alcohol, is found to be di(2'-ethyldecyl)-[3-(2''-dodecyl)-5-(3''-dodecyl)-α-methyl-4-hydroxybenzyl]phosphonate, a product of this invention.

Good results are likewise obtained when other methiodides are reacted with trialkyl phosphites in the manner of Example 2. For example, 3-methyl-5-tert-butyl-α-p-hexylphenyl-4-hydroxybenzyl dimethylamine can be prepared from the reaction of 2-methyl-6-tert-butylphenol with p-hexylbenzaldehyde and dimethylamine. This is then reacted with methyl iodide to form the methiodide which is then reacted with tri-n-propyl phosphite to form di-n-propyl - (3 - methyl - 5-tert-butyl-α-p-hexylphenyl-4-hydroxybenzyl)phosphonate. Likewise, 2 - n - butyl-6-(3'-octyl)-phenol can be reacted with n-propanal and dimethylamine to produce α - ethyl - 3-n-butyl-5-(3'-octyl-4-hydroxybenzyl)dimethylamine. This can then be reacted with methyl iodide and the 3-n-butyl-5-(3'-octyl)-α-ethyl-4-hydroxybenzyl dimethylamine methiodide thus produced can be reacted with tri-tert-butyl phosphite to form di-tert-butyl-[3 - n-butyl-5-(3'-octyl)-α-ethyl-4-hydroxybenzyl]. Also, 3,5-diisopropyl-α-n-butyl-4-hydroxybenzyl dimethylamine can be prepared from the reaction of 2,6-diisopropyl phenol with caproaldehyde and dimethylamine. This is reacted with methyl iodide to form the methiodide which is then reacted with triamyl phosphite to form diamyl-(3,5-diisopropyl-α-amyl-4-hydroxybenzyl)phosphonate.

*Example 3*

In a reaction vessel equipped with a stirrer, heater and water cooled condenser, 110 parts of methyl iodide are refluxed with 180 parts of 3-methyl-5-n-propyl-α-n-dodecyl-4-hydroxybenzyl dimethylamine (prepared by the reaction of 2-methyl-6-n-propyl phenol with n-tridecaldehyde and dimethylamine) in 200 parts of dioxane for two hours. The methiodide thus formed is filtered and air dried by suction. 25.0 parts of this methiodide is then added to 15.0 parts of triethyl phosphite in 100 parts of octanol in a reaction vessel equipped with a stirrer. The reaction mixture is stirred vigorously at 20° C. for one week after which 500 parts of water are added. A precipitate is formed which is recrystallized from hexane and found to be diethyl-(3-methyl-5-n-propyl-α-n-dodecyl-4-hydroxybenzyl)phosphonate.

Good results are also obtained when other methiodides are reacted with trialkyl phosphites in the manner of Example 3. For example, 3,5-di-tert-butyl-α-n-hexyl-4-hydroxybenzyl dimethylamine can be prepared from the reaction of 2,6-di-tert-butylphenol with dimethylamine and n-heptanal. This is reacted with methyl iodide to form the methiodide which is then reacted with trimethyl phosphite to form trimethyl-(3,5-di-tert-butyl-α-hexyl-4-hydroxybenzyl)phosphonate. Likewise, 2-tert-butyl-6-(3'-octyl)phenol can be reacted with n-octanal and dimethylamine to produce 3-tert-butyl-5-(3'-octyl)-α-n-heptyl-4-hydroxybenzyl dimethylamine. This can then be reacted with methyl iodide. The 3-tert-butyl-5-(3'-octyl)-α-n-heptyl-4-hydroxybenzyl dimethylamine methiodide thus produced can be reacted with tri-n-octyl phosphite to form di-n-octyl-[3-tert-butyl-5-(3'-octyl)-α-n-heptyl-4-hydroxybenzyl]phosphonate. Also, 3-methyl-5-n-dodecyl-α-phenyl-4-hydroxybenzyl phosphonate can be prepared from the reaction of 2-methyl-6-n-dodecyl phenol with benzaldehyde and dimethylamine. This is reacted with methyl iodide to form the methiodide which is then reacted with tri-n-butyl phosphite to form di-n-butyl(3-methyl-5-n-dodecyl-α-phenyl-4 - hydroxybenzyl)phosphonate.

The compounds of this invention are outstanding antioxidants. Therefore, an embodiment of this invention is a new composition of matter which comprises organic material normally tending to undergo oxidative deterioration in the presence of air, oxygen or ozone containing an appropriate quantity—from 0.001 to about 5 percent, and preferably from about 0.25 to about 2 percent—of a compound of this invention as described in Formula I above.

The compounds of this invention find important utility as antioxidants in a wide variety of oxygen-sensitive material. Thus, liquid hydrocarbon fuels such as gasoline, kerosene and fuel oil are found to possess increased storage stability by the use of an antioxidant of this invention. Likewise, liquid hydrocarbon fuels such as gasoline which contains organometallic additives such as tetraethyllead as well as other organometallic compounds which are used as fuel additives attain appreciably increased oxidative stability by the practice of this invention. In addition, lubricant oils and functional fluids, both those derived from naturally occurring hydrocarbons and those synthetically prepared are greatly enhanced by the practice of this invention. The addition of small quantities of the compounds of this invention to such materials as turbine, hydraulic, transformer and other highly refined industrial oils, soaps and greases; plastics; synthetic polymers such as polyethylene and polypropylene; organometallic compositions where such fluids contain tetraethyllead and tetraethyllead antiknock mixtures as well as other organometallics; elastomers, including natural rubber, lubricating greases; crankcase lubricating oils; and the like, greatly increase resistance to deterioration in the presence of air, oxygen or ozone.

The compounds of this invention are also very useful in protecting petroleum wax—paraffin wax and microcrystalline wax—against oxidative deterioration. They also find use in the stabilization of edible fats and oils of animal and vegetable origin which tend to become rancid, especially during long periods of storage because of oxidation deterioration. Typical representatives of these edible fats and oils are linseed oil, cod liver oil, castor oil, soybean oil, rapeseed oil, coconut oil, olive oil, palm oil, corn oil, sesame oil, peanut oil, babassu oil, butter fat, lard, beef tallow, and the like.

The compounds of this invention are also useful in preventing oxidative deterioration in lubricating oil compositions. Thus, an embodiment of this invention is a lubricating oil normally susceptible to oxidative deterioration in small antioxidant quantity, up to 5 percent, of a compound of this invention as defined above.

To prepare the lubricants of this invention an appropriate quantity—from about 0.001 to about 5 percent and preferably from about 0.25 to about 2 percent—of a compound of this invention is blended with the base oil to be protected. Suitable base oils include mineral oils and also synthetic diester oils such as sebacates, adipates, etc., which find particular use as aircraft instrument oils, hydraulic and damping fluids and precision bearing lubricants. All of these base oils are normally susceptible to oxidative deterioration, especially at elevated temperatures. The finished lubricants of this invention have much greater oxidation stability and many other improved performance characteristics as compared with the corresponding base oils.

To illustrate the benefits obtained by the practice of this invention a standard oil oxidation test is used. The equipment and test procedure described by Kroger et al., Erdol and Kohle, 2, page 398 (1949), served as a basis for the tests. The equipment and procedures are slightly modified in order to make the oxidizing conditions more strenuous. In this manner the test lubricants are subjected to severe oxidizing conditions in order to conclusively establish the effectiveness of additives under very adverse conditions. Furthermore, the modifications are found to provide results which correlated extremely well with test results of other standard procedures, including actual engine tests.

The equipment consists of a reaction cell connected with an open end manometer whereby the total uptake of oxygen by the oil is determined by noting the drop in height of the mercury in the manometer. The test oil sample is placed in the reaction cell which is then flushed with oxygen and the temperature is then raised and held at that selected for the test until the substrate oil undergoes catastrophic oxidation which is shown by a rapid oxygen uptake.

In tests of this nature, the oxidation stability of a test lubricant is determined by measuring its induction period, that is, the time required for catastrophic deterioration under the above outlined conditions. The longer the induction period, the more stable the lubricant. In tests of this nature, at 150° C., a base oil containing no additive had an induction time of 22 minutes while the same oil containing $2.10 \times 10^{-4}$ moles per liter of dimethyl(3,5-di-tert-butyl - 4 - hydroxybenzyl)phosphonate had an induction time of 119 minutes, thus increasing the induction time by a factor of greater than 5.4.

To further show the useful properties of the novel compounds of this invention, recourse is had to the Polyveriform Oxidation Stability Test as described in the paper entitled, "Factors Causing Lubricating Oil Deterioration in Engines" [Ind. and Eng. Chem., Anal. Ed., 17, 302 (1945)]. See also "A Bearing Corrosion Test for Lubricating Oils and Its Correlation With Engine Performance" [Al. Chem., 21, 737 (1949)]. This test effectively evaluates the performance of lubricating oil antioxidants. The test equipment procedure employed and correlations of the results with engine performance are discussed in the first paper cited above. By employing various compounds of this invention in oxygen-sensitive lubricating oil, effective inhibition of oxidative deterioration is achieved.

Comparative tests were conducted using the method and apparatus essentially as described in the paper mentioned above entitled, "Factors Causing Lubricating Oil Deterioration in Engines." One minor modification was that the steel sleeve and copper test piece described in this publication were omitted from the apparatus. In these tests an initially additive-free 95 V.I. solvent-refined SAE 10 crankcase oil was used. The principal test conditions consisted of passing 70 liters of air per hour through the test oil for a total period of 20 hours while maintaining the oil at a temperature of 300° F. Oxidative deterioration of the oil was further promoted by employing as oxidation catalysts 0.05 percent by weight of ferric oxide (as ferric 2-ethyl hexoate) and 0.10 percent by weight of lead bromide, both of these amounts being based upon the weight of oil employed.

Lubricating oils of this invention were prepared by blending compounds of this invention with the oil described above. These compositions were compared in the Polyveriform Test with a sample of the oil not containing the antioxidant.

As can be seen from the results listed in Table I, oils containing a compound of this invention give much superior results than base oils containing no additive.

TABLE I

| Additive | Additive Concentration, Wgt. percent | Acid Number | Viscosity Increase, SUS at 100° F. |
| --- | --- | --- | --- |
| None | 0 | 7.8 | 126 |
| Dimethyl(3,5-di-tert-butyl-4-hydroxybenzyl)phosphonate | 1.0 | 1.9 | 13 |
| Diethyl(3,5-di-tert-butyl-4-hydroxybenzyl)phosphonate | 1.15 | 1.9 | 19 |
| Di-n-hexyl(3,5-di-tert-butyl-4-hydroxybenzyl)phosphonate | 2.175 | 2.5 | 23 |
| Diisopropyl(3,5-di-tert-butyl-4-hydroxybenzyl)phosphonate | 1.0 | 3.5 | 39 |

In addition to the above test, another test of a similar nature was run. This test is a modification of the previous test and is found to give good correlation with full engine tests. The above apparatus is used, the principal test conditions consisting of passing 48 liters of air per hour through the test oil for a total period of 116 hours while maintaining the oil at a temperature of 300° F. A catalyst is present in the form of two iron and two copper metal squares (1″ x 1″), tied together alternately in the form of a fence. The criteria of oxidation are acid number, percent viscosity increase (SUS at 100° F.), sludge and varnish (the two latter ratings are recorded as A through E). In a test of this nature, base oils had acid numbers of from 6 to 8, viscosity increases of well over 100 and sludge and varnish ratings of from C to E, while base oils containing 1.0 weight percent of dimethyl(3,5-di-tert-butyl-4-hydroxybenzyl)phosphonate had an acid number of only 1.3, a viscosity increase of only 25 percent and sludge and varnish ratings of A and B respectively, thus showing great improvement over base oils not containing a compound of this invention.

The following examples illustrate the preferred lubricating oil compositions of this invention.

Example 4

To 1,000 parts of a solvent refined neutral oil 195 V.I. and 200 SUS at 100° F. containing 6 percent of a commercial methacrylate Type VI approver which gives the finished formulation of a VI of 140 and a viscosity of 300 SUS at 100° F. is added 5 percent of dimethyl(3,5-di-tert-butyl-4-hydroxybenzyl)phosphonate.

Example 5

To an additive-free solvent refined crankcase lubricating oil having a viscosity index of 95 and an SAE viscosity of 10 is added 0.001 percent of diethyl(3,5-di-tert-butyl-4-hydroxybenzyl)phosphonate.

Example 6

To 100,000 parts of a petroleum hydrocarbon oil having a gravity of 30.3 API at 60° F., a viscosity of 178.8 SUS at 100° F., a viscosity index of 154.2 and which contains 0.2 percent sulfur, is added 200 parts of diisopropyl(3,5-di-tert-butyl - 4 - hydroxybenzyl)phosphonate. The resulting oil possesses greatly enhanced resistance to oxidative deterioration.

Example 7

To 100,000 parts of a commercially available pentaerythritol ester having a viscosity at 100° F. of 22.4 centistokes, and known in the trade as "Hercoflex 600" is added 400 parts, 0.4 percent of di-sec-butyl(3,5-di-tert-butyl-4-hydroxybenzyl)phosphonate. The resulting finished oil possesses markedly improved resistance against oxidative deterioration.

Example 8

To 100,000 parts of dioctyl sebacate having a viscosity of 210° F. of 36.7 SUS, a viscosity index of 159 and a molecular weight of 42 is added 250 parts, 0.25 percent of di-n-hexyl(3,5-di-tert-butyl - 4 - hydroxybenzyl)phosphonate.

The compounds of this invention are also useful in preventing oxidative deterioration in petroleum waxes. These petroleum waxes comprise paraffin wax and microcrystalline wax. These materials are solid ductile wax-like mixtures of high molecular weight hydrocarbons, normally derived from that part of crude petroleum commonly designated as paraffin distillate. Paraffin wax is composed mostly of straight chain paraffin hydrocarbons and usually has a melting point of between 120 and 150° F. Microcrystalline wax is composed chiefly of branched chain paraffinic hydrocarbons and has a melting point of about 150 to about 185° F.

It is well-known that petroleum waxes are composed chiefly of these paraffinic hydrocarbons which are insensitive toward oxidation. However, even if extreme care is exercised in the manufacture of petroleum waxes to remove the natural content of resinous or asphaltic oil, petroleum waxes tend to form disagreeable odors and undergo darkening in color. These transformations result from oxidation and polymerization reactions involving traces of impurities in the wax, these reactions being catalyzed by the action of light, particularly ultraviolet light and by traces of metallic impurities. Not only do these reactions result in disruption of product specifications, but the rancidity of the wax is particularly undesirable. Petroleum waxes find widespread use in the preparation of paper coatings, food containers and food wrappings. Many foodstuffs packaged in paper or containers coated with petroleum waxes acquire a disagreeable taste when the petroleum wax becomes rancid.

Accordingly, in an embodiment of this invention, there is provided a petroleum wax normally susceptible to undesirable catalyst promoted oxidation and polymerization reactions containing, in an amount sufficient to inhibit such reactions, a small quantity—from 0.001 to about 5 percent—of a compound of this invention, preferably dimethyl(3,5-di-tert-butyl - 4 - hydroxybenzyl)phosphonate.

To illustrate the benefits derived from this invention a typical paraffin wax composition of this invention is subjected to comparative tests with other paraffin wax compositions. The method employed involves compounding an improved paraffin wax by admixing 0.005 weight percent of dimethyl(3,5-di-tert-butyl-4-hydroxybenzyl)phosphonate with the wax. The wax employed had a melting point of about 138° F. and was produced by dewaxing a waxy raffinate from a furfural solvent refining process, and involved recrystallization of the wax from solvent to produce a pure wax having no odor, 0.09 percent oil and a peroxide number of 0. A weighted portion of this improved wax is placed in a glass container, covered and placed in an oven at 250° F. The test sample is removed periodically and smelled by at least two people to attempt to detect the characteristic odor of oxidized wax. If oxidized wax odor is present a portion of the test sample is analyzed for peroxide number while the remainder is replaced in the oven for further testing. This procedure is repeated until the test sample reaches a peroxide number of 5. An equal portion of the uninhibited wax, when subjected to this test, reached a peroxide number of 5 in less than 78 hours while the sample which contained dimethyl(3,5-di-tert-butyl - 4 - hydroxybenzyl) phosphonate did not oxidize to a peroxide number of 5 until after 20 hours at the test conditions. Thus, even in the small concentration employed dimethyl(3,5-di-tert-butyl-4-hydroxybenzyl)phosphonate is an outstandingly effective inhibitor of oxidation in paraffin wax.

Stable paraffin wax compositions of this invention are further illustrated by the following specific examples wherein all parts are by weight.

*Example 9*

To 100 parts of melted paraffin wax having a viscosity of 40 SUS at 210° F. is added one part of diethyl(3,5-di-tert-butyl-4-hydroxybenzyl)phosphonate.

*Example 10*

One part of diisopropyl(3,5-di-tert-butyl-4-hydroxybenzyl) phosphonate is added to and mixed with 1000 parts of melted microcrystalline wax having a melting point of 160° F. and a viscosity of 70 SUS at 210° F.

*Example 11*

To 100 parts of melted microcrystalline wax having an average molecular weight of about 500 and a melting point of 150° F. is added two parts of di-n-hexyl(3,5-di-tert-butyl-4-hydroxybenzyl) phosphonate.

*Example 12*

To 100 parts of melted paraffin wax having a melting point of 125° F. and having a viscosity of 35 SUS at 210° F. is added, with stirring, one part of di-sec-butyl (3,5-di-tert-butyl-4-hydroxybenzyl)phosphonate.

The compounds of this invention are also useful as additives to functional fluids and automatic transmission fluids. The primary constituent of a functional fluid is a refined mineral lubricating oil having carefully selected minimum viscosity of 49 Saybolt Universal seconds SUS at 210° F. and a maximum viscosity of 7,000 SUS at 0° F., generally a distillate oil, lighter than an SAE 10 motor oil. The oil usually amounts to between about 73.5 to about 97.5 percent by weight of the finished fluid. Preferably, the base oil is selected from a paraffin base distillate such as a Pennsylvania crude.

The fluids usually contain compounds which are characterized by containing one or more organic components which may be alkyl, aryl, alkaryl or aralkyl groups that are bonded to one or more metal atoms through coupling groups such as sulfonate, hydroxyl, carboxyl and mercaptan. The metal atoms may be aluminum, calcium, lithium, barium, strontium, and magnesium. The organic components contain oil solubilizing groups such as high molecular weight straight or branched chain paraffins, aromatic or naphthenic rings, or contain a halogen. These metal compounds are present in the compounded fluid in a concentration range of between about 0.1 to about 5 percent by weight. These compounds include alkaline-earth metal salts of phenyl-substituted long chain fatty acids, alkaline-earth metal salts of the capryl or octyl esters of salicylic acid, the alkaline-earth metal salts of petroleum sulfonic acids, the alkaline-earth metal salts of alkyl-substituted phenol sulfides, the salt of aluminum or the alkaline-earth metals with cetyl phenol, and the metal salts of wax-substituted phenol derivations. Another class of additives are the so-called overbased phenates and sulfonates, which can be prepared by reaction between an alkyl phenol or alkyl phenol sulfide and an alkaline-earth metal oxide or hydroxide at an elevated temperature. The overbased phenate formed from the reaction contains up to 2 or 3 times as much metal as the normal phenate.

In addition, functional fluids may contain additional components which improve the properties of the fluid. Typical components include anti-squawk additives, pour point depressants, foam inhibitors, rust preventatives, extreme pressure agents, metal deactivators and viscosity index improvers.

The following examples show typical functional fluids of this invention. The fluids are formed by mixing the ingredients together while heating the oil to a temperature up to 200° F.

*Example 13*

A fluid of this invention is prepared by blending 80 parts of a conventionally-refined Pennsylvania mineral oil (99 SUS at 100° F.), 2 parts of di-n-amyl(α-ethyl-3-n-propyl-5-isopropyl-4-hydroxybenzyl)phosphonate, 5 parts of barium petroleum sulfonate, 10 parts of a polyacrylate having a molecular weight of approximately 7,000 derived from a fatty alcohol such as cetyl or lauryl alcohol, 0.1 part of a dimethyl silicone polymer anti-foam agent, 2 parts of a dialkyl zinc dithiophosphate and 0.9 part of a dark, viscous liquid having a viscosity of 560 SUS at 210° F., a flash point of 420° F., a pour point of 30° F. and a specific gravity of 60/60° F. at 0.919.

*Example 14*

Another such fluid consists of 95 parts of a solvent-refined, light acid-treated, clay-contacted, solvent dewaxed paraffin base distillate mineral oil (110 SUS at 100° F.); 0.1 part of di-n-dodecyl(α-methyl-3-propyl-5-sec-butyl-4-hydroxybenzyl)phosphonate; 0.1 part of calcium octyl phenol sulfide; 2 parts of sulfurized sperm oil having a sulfur content of between 10–12 percent, a viscosity of 210° F. of 200 SUS and a pour point of 65° F.; 0.3 part of an ester of an aromatic acid and wax-alkylated phenol having a molecular weight of approximately 450; 2.5 parts of a linear pale color isobutylene polymer of a controlled molecular weight having a viscosity of 3,000 SUS at 210° F., and a specific gravity at 60/60° F. of 0.875.

Liquid hydrocarbon fuels employed in the operation of spark ignition combustion engines are also vastly improved in their storage stability by the practice of tis invention. Table II below, gives the compositions of a number of typical commercial gasolines which may be stabilized against oxidative deterioration by the inclusion therein of a compound of this invention.

TABLE II.—GASOLINE COMPOSITIONS

| Gasoline | Percent Aromatics | Percent Olefins | Percent Saturates | Gravity, °API |
|---|---|---|---|---|
| A | 26.6 | 20.8 | 52.6 | 62.1 |
| B | 8.6 | 7.9 | 83.5 | 68.5 |
| C | 20.0 | 41.2 | 38.8 | 62.9 |
| D | 20.5 | 32.9 | 46.6 | 63.5 |
| E | 38.1 | 7.3 | 54.6 | 59.3 |

*Example 15*

To 1,000 parts of Gasoline A, as described in Table II, is added 10 parts of di-n-heptyl(α-amyl-3-ethyl-5-n-hexyl-4-hydroxybenzyl)phosphonate.

*Example 16*

To 10,000 parts of Gasoline B is added 500 parts of di-n - decyl[α - n- butyl - 3 - n - octyl - 5 - (3' - dodecyl)-4-hydroxybenzyl]phosphonate.

*Example 17*

To 10,000 parts of Gasoline C is added one part of di-n - undecyl(α - n - undecyl - 3 - n - hexyl - n - nonyl - 4-hydroxybenzyl)phosphonate.

Most gasolines in commercial use also contain an organometallic antiknock agent and certain scavengers therefor. The antiknock agent most frequently employed is tetraethyllead. The scavengers are ordinarily halohydrocarbon compounds of chlorine and bromine. Most widely used of these are ethylene dibromide and ethylene dichloride. In addition, gasolines often contain other additives such as dyes and phosphorus containing corrective agents. These gasoline compositions containing additives are also protected against oxidative deterioration by the practice of this invention as demonstrated by the following examples.

Example 18

To 10,000 parts of Gasoline D, which contains 2.39 g./gal. of tetraethyllead and one theory of bromine as ethylene dibromide, is added 100 parts of di-n-octyl(3-n-dodecyl-4-hydroxybenzyl)phosphonate.

Example 19

To 1,000 parts of Gasoline E, which contains 2.47 g./gal. of lead as tetraethyllead, one theory of chlorine as ethylenedichloride, 0.5 theory of bromine as ethylene dibromide and 0.2 theory of phosphorus as tris($\beta$-chloroisopropyl)thionophosphate, is added 5 parts of di-n-dodecyl(3-n-butyl-5-n-propyl-4-hydroxybenzyl)phosphonate.

The tetraethyllead antiknock additive is supplied to oil companies as a mixture already containing the necessary dyes and scavengers. These mixtures, which are commonly known as antiknock fluid compositions, are also protected against oxidative deterioration by the practice of this invention.

Example 20

To an antiknock fluid composition which is to be used as an additive to gasoline and which contains 61.5 parts of tetraethyllead, 17.9 parts of ethylene dibromide and 18.8 parts of ethylene dichloride is added with agitation 1.3 parts of diethyl(3,5-di-n-octyl-4-hydroxybenzyl)phosphonate. The resulting composition is stable for long periods when exposed to air.

Example 21

To 1,000 parts of a commercially available diesel fuel having an octane number of 51.7 and a 50 percent evaporation temperature of 509° F. is added 3 parts of didodecyl(3,5-di-tert-butyl-4-hydroxybenzyl)phosphonate. The resulting fuel is stable to oxidative deterioration.

The compounds of this invention are also very effective antioxidants for high molecular weight unsaturated hydrocarbon polymers, such as polybutadiene, methyl rubber, polybutene rubber, natural rubber, butyl rubber, GR–S rubber, GR–N rubber, piperylene rubber, dimethyl butadiene rubber and the like. Thus a preferred embodiment of the present invention is a rubber containing as an antioxidant therefor, a compound of this invention as defined above. Another part of this invention is the method of preserving rubber which comprises incorporating therein a compound of this invention as defined above. The stabilizer is incorporated into the rubber by milling, Banbury mixing, or similar process, or is emulsified and the emulsions added to the rubber latex before coagulation. In the various embodiments of this invention the stabilizer is used in small amounts, generally ranging from about 0.01 to about 5.0 percent, based on the rubber.

As used in the description and claims, the term "rubber" is employed in a generic sense to define a high molecular weight plastic material which possesses high extensibility under load coupled with the property of forcibly retracting to approximately its original size and shape after the load is removed. It is preferable that the rubber be a sulfur-vulcanizable rubber, such as India rubber, reclaimed rubber, balata, gutta percha, rubbery conjugated diene polymers and copolymers exemplified by the butadiene-styrene (GR–S and butadiene-acrylonitrile, GR–N or Paracril) rubbers and the like, although the invention is applicable to the stabilization of any rubber, high molecular weight organic material which is normally susceptible to deterioration in the presence of oxygen, air, or ozone. The nature of these rubbers is well-known to those skilled in the art.

Among the definite advantages provided by this invention is that the present rubber compositions possess unusually great resistance against oxidative deterioration. Moreover, these compositions exhibit excellent non-staining and non-discoloration characteristics. Furthermore, the novel stabilizer is relatively inexpensive and easily prepared, and possesses the highly beneficial property of low volatility. As is well-known, a highly desirable feature of a rubber antioxidant is that it have a low volatility so that it remains admixed with the rubber during vulcanization and related process steps.

The rubber compositions of the present invention are illustrated by the following specific examples wherein all parts and percentages are by weight.

Example 22

To illustrate the enhanced oxygen resistance of the rubber compositions of this invention and their excellent nonstaining and non-discoloration characteristics, a light-colored stock is selected for test. This stock had the following composition.

| | Parts by weight |
|---|---|
| Pale crepe rubber | 100.00 |
| Zinc oxide filler | 50.00 |
| Titanium dioxide | 25.00 |
| Stearic acid | 2.00 |
| Ultramarine blue | 0.12 |
| Sulfur | 3.00 |
| Mercaptobenzothiazole | 1.00 |
| | 181.12 |

To the above base formula is added one part by weight of dimethyl(3,5 - di-tert-butyl-4-hydroxybenzyl)phosphonate and individual samples are cured for 20, 30, 45 and 60 minutes at 274° C. using perfectly clean molds with no mold lubricant. Another set of samples of the same base formula which do not contain an antioxidant are cured under the same conditions.

To demonstrate the protection afforded to the rubber by the practice of this invention, the tensile strength and the ultimate elongation of stocks prepared by the addition of the inhibitor are determined before and after aging. These properties are also determined on the inhibitor-free stocks. The aging is accomplished by conducting the procedure of ASTM Designation: D–572–52, described in the ASTM Standards for 1952, Part 6, for a period of 168 hours at a temperature of 70° C. with an initial oxygen pressure in the test bomb of 300 p.s.i.g.

The tensile strength and the ultimate elongation of the test specimens before and after aging are measured by ASTM Test Procedure, D–412–51T (ASTM Standards for 1952, Part 6). The tensile strength is the tension load per unit cross-sectional area required to break a test specimen, while the ultimate elongation is the elongation at the moment of rupture of a test specimen. A decrease in the values for either of these properties upon aging represents a decrease in the usefulness of the article fabricated therefrom, so that the degree to which these properties are retained is a direct measure of the utility of the protective substance.

Measurements are also made of the increase in weight of the test specimens which occur during the accelerated aging. This is a direct measure of the oxygen up-take of the samples and provides another criterion of the effectiveness of an inhibitor in suppressing oxidative deterioration of the rubber. Thus, the larger the weight increase, the greater is the deterioration and the less effective is the inhibitor.

In all the above tests, the composition compounded with dimethyl(3,5-di-tert-butyl - 4 - hydroxybenzyl)phosphonate gives results which show this additive to be an excellent antioxidant.

Example 23

To a synthetic rubber master batch comprising 100 parts of GR–S rubber having an average molecular weight of 60,000, 50 parts of mixed zinc propionate-stearate, 50 parts of carbon black, 5 parts of road tar, 2 parts of sulfur and 1.5 parts of mercaptobenzothiazole is incorporated 1.5 parts of diethyl(3,5-di-tert-butyl-4-hydroxybenzyl) phosphate. This batch is then cured for 60 minutes at 45 p.s.i. of steam pressure.

Example 24

Natural rubber stock is compounded according to the following formula:

| | Parts |
|---|---|
| Thick gristly crepe natural rubber | 100.0 |
| Wax | 2.0 |
| Ultramarine dye | 0.1 |
| Zinc oxide | 70.0 |
| Titanium dioxide | 20.0 |
| Sulfur | 3.0 |
| Stearic acid | 1.2 |
| Diisopropyl(3,5-di-tert-butyl-4-hydroxy-benzyl) phosphate | 1.0 |
| Benzothiazyl disulfide | 0.4 |
| Amine activator | 0.5 |

This stock is then vulcanized for 60 minutes at 280° F.

Example 25

A butadiene-acrylonitrile copolymer is produced from butadiene-1,3 and 32 percent of acrylonitrile. Two percent (based on the dry weight of the copolymer) of di-n-hexyl(3,5-di-tert-butyl-4-hydroxybenzyl)phosphate is added as an emulsion in sodium oleate solution to the latex obtained from emulsion copolymerization of the monomers. The latex is coagulated with a pure grade of aluminum sulfate and the coagulum, after washing, is dried for 20 hours at 70° C.

Each of the above illustrated rubber compositions of this invention possesses greatly improved resistance against oxidative deterioration as compared with the corresponding rubber compositions which are devoid of an antioxidant. Moreover, the light-colored stocks of the above examples exhibit virtually no discoloration or staining characteristics even when subjected to severe weathering conditions and the like. The methods of formulating the improved rubber compositions of this invention will now be clearly apparent to those skilled in the art.

The amount of stabilizer employed in the rubber compositions of this invention varies from about 0.01 to about 5 percent by weight based on the weight of the rubber. The amount used depends somewhat upon the nature of the rubber being protected and the conditions of service to be encountered. Thus, in the stabilization of natural and synthetic rubber to be used in the manufacture of tires which are normally subjected to exposure to the elements, as well as to the action of sunlight, frictional heat, stress and the like, the use of relatively high concentrations of this inhibitor is advantageous. On the other hand, when the article of manufacture is not to be subjected to such severe conditions, relatively low concentrations can be successfully utilized. Generally speaking amounts ranging from about 0.1 to about 3 percent by weight give uniformly satisfactory results.

Other rubbers and elastomers which can be prepared according to this invention are the rubbery polymerizates of isoprene, butadiene-1,3, piperylene; also the rubbery copolymer of conjugated dienes with one or more polymerizable monoolefinic compounds which have the capability of forming rubber copolymers with butadiene-1,3, outstanding examples of such monoolefinic compounds being those having the group $CH_2=C<$, exemplified by styrene. Examples of such monoolefins are styrene, vinyl naphthalene, alpha methyl styrene, p-chlorostyrene, dichlorostyrenes, acrylic acid, methyl acrylate, methyl methacrylate, methacrylonitrile, methacrylamide, methyl vinyl ether, methyl vinyl ketone, vinylidine chloride, vinyl carbazole, vinyl pyridine, alkyl-substituted vinyl pyridines, etc. In fact, excellent stabilization is achieved by incorporating a compound of this invention in any of the well-known elastomers which are normally susceptible to deterioration in the presence of air, such as elastoprenes, elastolenes, elastothiomers, and elastoplastics.

As pointed out above, the compounds of this invention are effective antioxidants when added to other organic compositions normally tending to undergo deterioration in the presence of air, oxygen or ozone. The following examples illustrate various embodiments of this aspect of the invention.

Example 26

To a master batch of high molecular weight polyethylene having an average molecular weight of about 1,000,000, a tensile strength of 6,700 p.s.i., a Shore D hardness of 74 and a softening temperature under low load of 150° C. is added 5 percent of di-n-undecyl(3,5-di-n-undecyl-4-hydroxybenzyl)phosphonate to prepare a composition of outstanding oxidative stability.

Example 27

A linear polyethylene having a high degree of crystallinity, up to 93 percent, and below one ethyl branched chain per 100 carbon atoms, a density of about 0.96 gram per milliliter and which has about 1.5 double bonds per 100 carbon atoms, is treated with $50 \times 10^{-6}$ roentgens of $\beta$-radiation. To the thus irradiated polymer is added 0.005 percent of diamyl(3,5-di-tert-butyl-4-hydroxybenzyl)phosphonate, and the resulting product has better stability characteristics.

Example 28

Two parts of dimethyl(3,5-diisopropyl-4-hydroxybenzyl)phosphonate are added with milling to 100 parts of a low density polyethylene prepared by high pressure polymerization and which has an average molecular weight of 18,000 to 20,000. The resulting product is vastly improved in its oxidative stability.

Example 29

To 10,000 parts of a polyethylene having an average molecular weight of about 100,000 and which has a tensile strength of 5400 p.s.i., a Shore D hardness of 70 and a softening temperature of 130° C. under low load, is added 10 parts of diisopropyl($\alpha$-isopropyl-3,5-diisopropyl-4-hydroxybenzyl)phosphonate to prepare a composition of outstanding oxidative stability.

I claim:

1. Organic material normally tending to undergo oxidative deterioration in the presence of air, oxygen or ozone, containing a small antioxidant quantity, up to 5 percent, of a compound having the formula:

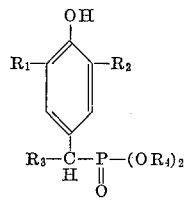

wherein $R_1$ is an alkyl radical having from 1–12 carbon atoms, $R_2$ is an alkyl radical having from 3–12 carbon atoms, $R_3$ is selected from the group consisting of hydrogen, alkyl radicals having from 1–12 carbon atoms and mononuclear aryl radicals having from 6–12 carbon atoms, and $R_4$ is an alkyl radical having from 1–12 carbon atoms.

2. The composition of claim 1 wherein said organic material is petroleum wax.

3. Lubricating oil containing a small antioxidant quantity, up to 5 percent, of dimethyl(3,5-di-tert-butyl-4-hydroxybenzyl)phosphonate.

4. The composition of claim 1 wherein said organic material is rubber.

5. Rubber containing a small antioxidant quantity, up to 5 percent, of di-sec-butyl(3,5-di-tert-butyl-4-hydroxybenzyl)phosphonate.

6. The composition of claim 1 wherein said compound is dimethyl(3,5-di-tert-butyl-4-hydroxybenzyl) phosphonate.

7. The composition of claim 1 wherein said compound is diethyl(3,5-di-tert-butyl-4-hydroxybenzyl)phosphonate.

8. The composition of claim 1 wherein said compound is diisopropyl(3,5-di-tert-butyl-4-hydroxybenzyl)phosphonate.

9. The composition of claim 1 wherein said compound is di-n-hexyl(3,5-di-tert-butyl-4-hydroxybenzyl)phosphonate.

10. The composition of claim 1 wherein said compound is di-sec-butyl(3,5-di-tert-butyl-4-hydroxybenzyl)phosphonate.

11. The composition of claim 1 wherein said organic material is selected from the group consisting of lubricating oil, mineral oil, turbine oil, transformer oil, fuel oil, kerosene, gasoline, oils of animal origin, oils of vegetable origin, grease, paraffin wax, rubber, polyethylene and polypropylene.

12. The composition of claim 1 wherein said organic material is polyethylene.

13. The composition of claim 1 wherein said organic material is polypropylene.

14. Lubricatng oil containing a small antioxidant quantity, up to 5 percent, of a compound having the formula:

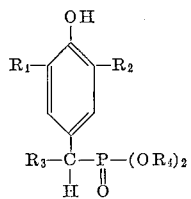

wherein $R_1$ is an alkyl radical havng from 1–12 carbon atoms, $R_2$ is an alkyl radical having from 3–12 carbon atoms, $R_3$ is selected from the group consisting of hydrogen, alkyl radicals having from 1–12 carbon atoms and mononuclear aryl radicals having from 6–12 carbon atoms, and $R_4$ is an alkyl radical having from 1–12 carbon atoms.

15. Gasoline containing a small antioxidant quantity, up to 5 percent, of a compound having the formula:

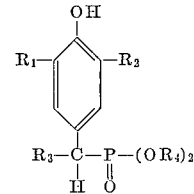

wherein $R_1$ is an alkyl radical having from 1–12 carbon atoms, $R_2$ is an alkyl radical having from 3–12 carbon atoms, $R_3$ is selected from the group consisting of hydrogen, alkyl radicals having from 1–12 carbon atoms and mononuclear aryl radicals having from 6–12 carbon atoms, and $R_4$ is an alkyl radical having from 1–12 carbon atoms.

References Cited by the Examiner
UNITED STATES PATENTS

| | | | |
|---|---|---|---|
| 2,224,695 | 12/1940 | Prutton | 252—49.8 X |
| 2,228,658 | 1/1941 | Farrington et al. | 252—49.8 X |
| 2,553,417 | 5/1951 | Ladd et al. | 252—49.8 X |
| 2,632,018 | 3/1953 | Kosolapoff | 252—49.8 X |
| 2,969,378 | 1/1961 | Gleim et al. | 260—45.95 |
| 3,017,422 | 1/1962 | Thompson | 260—45.95 X |

DANIEL E. WYMAN, *Primary Examiner.*

ALPHONSO D. SULLIVAN, *Examiner.*